Jan. 30, 1962   J. F. LAYCAK   3,019,346
ELECTRONIC SURFACE INSPECTION SYSTEM
Filed March 28, 1960   2 Sheets-Sheet 1
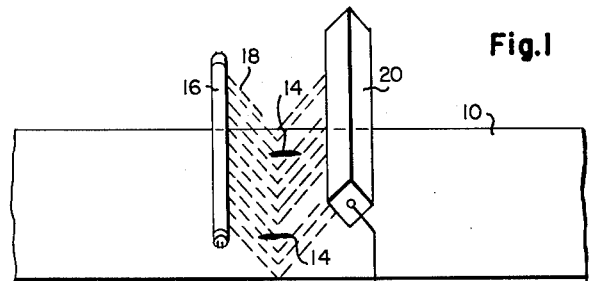
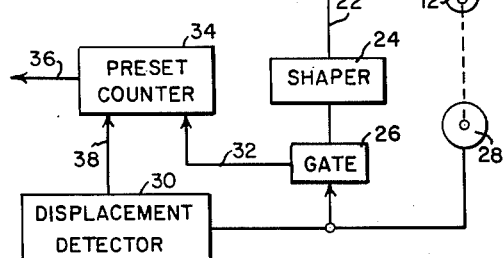
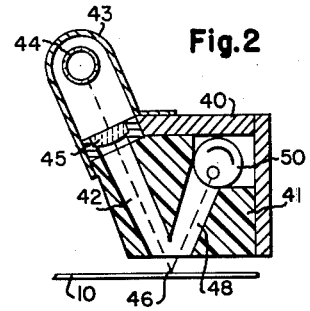
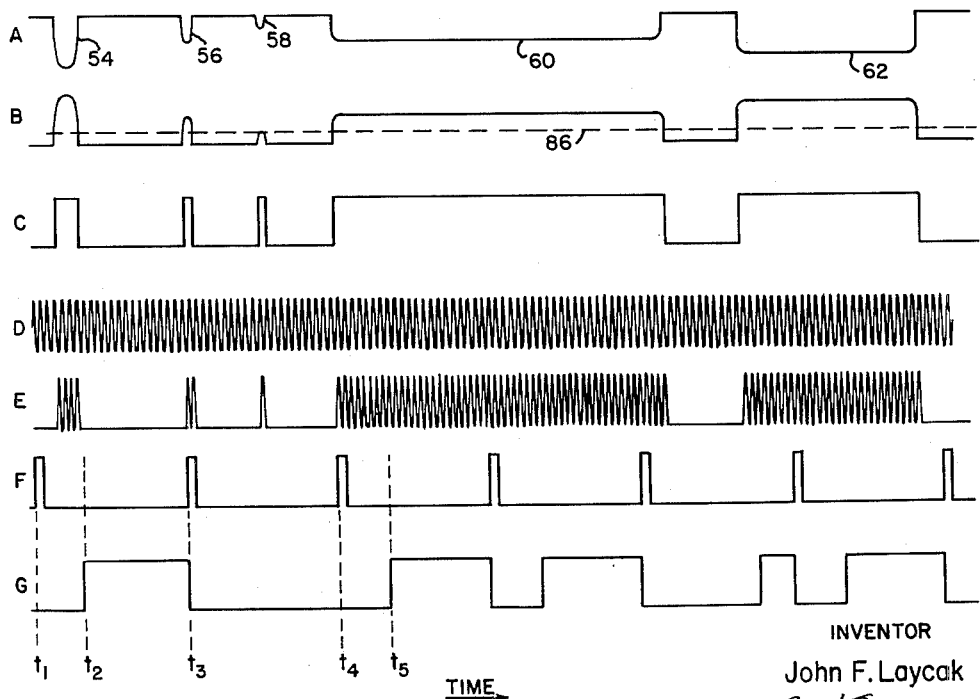
INVENTOR
John F. Laycak
BY *[signature]*
ATTORNEY

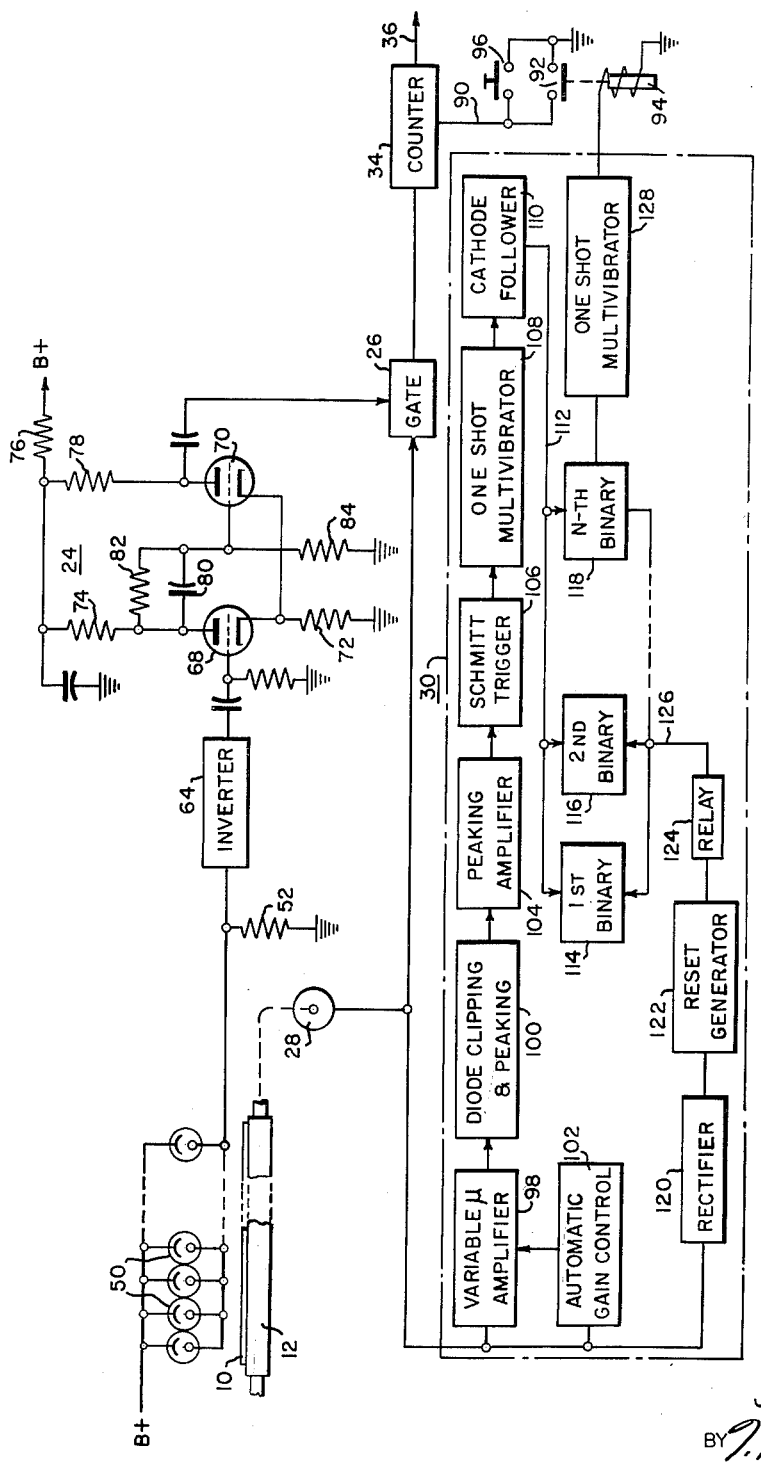

United States Patent Office 3,019,346
Patented Jan. 30, 1962

3,019,346
ELECTRONIC SURFACE INSPECTION SYSTEM
John F. Laycak, Duquesne, Pa., assignor to Jones & Laughlin Steel Corporation, Pittsburgh, Pa., a corporation of Pennsylvania
Filed Mar. 28, 1960, Ser. No. 17,813
13 Claims. (Cl. 250—219)

This invention relates to a system adapted to automatically inspect hot or cold articles for surface discontinuities and quality where the surface imperfections are discernible by differences in color, emitted light, reflected light, or combinations of these. The output of the inspection system can then be used to separate, mark or remove defects by controlling machinery for performing these operations.

As an overall object, the present invention seeks to provide a system for inspecting the surface of any material in which defects on the surface have a generally different optical appearance than the remainder of the material. In the case of a reflective surface, defects will generally have a lower light intensity and appear darker than the remainder of the material when light is directed thereon. Similarly, in the case of an irradiant, hot object, defects will appear brighter or darker than the main body of the object. These differences in intensity may be converted, by means of a photosensitive device, into electrical current variations which, in turn, may be used to indicate the presence of the defects, or for control purposes. If the defects have a different color than the remainder of the material, suitable filters may be employed whereby only a particular color or colors will activate a photosensitive device to produce an electrical current variation with the same result as that achieved with an irradiant or reflective surface.

Another object of the invention resides in the provision of a surface inspection system for moving material in which the output of the system will always be the same for a given surface imperfection condition regardless of the speed of the material being inspected.

Still another object of the invention resides in the provision of a surface inspection system of the type described which will individually inspect the surface of successive lengths of material and produce an output signal whenever the character of the defects in each individual or successive length exceeds a predetermined condition.

In the particular embodiment of the invention shown and described herein, the surface of reflective tin plate or the like is inspected where, if the material being inspected is in coil form, the resultant output signal can be used to form a record of the tin plate quality. In the case of sheared sheet inspection, the output signal may be used to reject sheets containing defects in excess of a predetermined amount. In either case, the material being inspected travels along a conveyor, and the surface of the material is illuminated along a narrow path extending substantially perpendicular to the direction of movement of the material. Above this narrow band of light in the beam of light reflected from the reflective surface is a bank of photoelectric cells connected in a circuit arrangement to produce a current variation in response to an increase in the impedance presented by any one of the cells in the bank. Thus, when a defect passes under the narrow light band, the light reflected from that particular portion of the surface will decrease, and the impedance of the photoelectric cell disposed above the defect will increase to produce an output current variation which will persist for the period during which the defect passes through the aforesaid narrow band of light. Means are included in the system for producing a pulse whenever the current variation exceeds a predetermined magnitude. Thus, the sum of the widths of the pulses produced in this manner for any given length of the material being inspected will be a function of the portion of that particular length of the material which contains defects.

In order to obtain an indication of the total width of the pulses produced whenever defects pass under the light band, and hence that portion of the length of the material which contains defects, an alternating current signal having a frequency proportional to the speed of the material being inspected is gated by the aforesaid pulses, and the resulting oscillations passing through the gating means are counted in counting circuitry. If the body being inspected should slow down, the length of a gating pulse representing a particular defect will increase; however the frequency of the alternating current signal which is gated by this pulse will decrease since it is a function of the speed of the material being inspected. Similarly, the frequency of the alternating current signal will increase when the width of the defect pulses decreases in response to an increase in the speed of the material being inspected. In this manner, the number of oscillations passing through the gating means will be the same for any given defect condition regardless of the speed of the material being inspected.

Whenever the number of oscillations passing through the gate exceeds a certain value, the counter will produce an output signal to indicate that a predetermined length of the surface being inspected contains defects. At the same time, the counter is automatically reset each time the material being inspected travels a given distance, say five feet. Thus, if the length of the defects in any given five-foot length of the inspected material does not exceed the aforesaid predetermined length, the counter will not produce an output pulse before being reset to again start counting from zero, thereby indicating that that particular five-foot length has passable surface quality. On the other hand, if an output pulse is produced by the counter before it is reset, the significance is that that particular five-foot length of the material is not of passable surface quality. In this manner, successive lengths of the material are inspected individually and are identified as being of inferior surface quality if the aforesaid counter produces an output signal.

The above and other objects and features of the invention will become apparent from the following detailed de-drawings which form a part of this specification and in which:

FIG. 7 is a schematic diagram of the overall system of the invention;

FIG. 2 is a cross-sectional side view of one type of apparatus which may be used to direct a light beam onto the surface of reflective material in accordance with the teachings of the invention;

FIG. 3 is a detailed block and schematic circuit diagram of one embodiment of the invention; and FIG. 4 is an illustration of wave forms appearing at various points in the circuit of FIG. 3.

Referring to FIG. 1, a continuous length of reflective sheet material 10, such as tin plate, is illustrated as passing over a series of conveyor rolls 12, only one of which is shown herein. On the surface of strip 10 are defects 14 which have a lesser reflectivity than the remainder of the material; and in the case of tin plate, these defects may comprise pin holes or other surface blemishes. Disposed above strip 10 is a fluorescent lamp 16 or the like which directs a narrow beam of light 18 onto the surface of strip 10 along a path extending substantially perpendicular to the direction of movement of the strip. The light reflected from the strip is then sensed by a bank of photoelectric cells, generally indicated at 20. As will hereinafter become apparent, the bank of photoelectric cells 20 comprises a plurality of such cells spaced across the width of strip 10 and connected in a circuit arrangement whereby a current variation will be produced on output lead 22 whenever the light intensity sensed by one or more of the photoelectric cells decreases in response to a defect passing under the light beam 18. Thus, when a defect 14 passes under the light beam, the impedance presented by the photo-electric cell or cells disposed directly above the defect will increase, thereby producing a decrease in current on output lead 22. However, in the absence of surface blemishes, the combined output of the photoelectric cells will remain constant at a given voltage level. Should a surface defect intercept the field of any one of the photoelectric cells, the combined output will exhibit an excursion for the duration of the defect. In this manner, a pulse will be produced on lead 22 whenever a defect passes under the light beam, and this pulse will have a width proportional to the length of the defect. These pulses are passed through shaper 24 to a gate circuit 26.

Connected to one of the conveyor rolls 12 is a tachometer generator 28 which will produce an alternating current signal having a frequency proportional to the speed of the moving strip 10. This alternating current signal is fed to the gate circuit 26 as well as a displacement detector 30. In gate circuit 26 the output of tachometer generator 28 is gated with the pulses from shaper 24 to produce a series of groups of oscillations on lead 32 in which the number of oscillations in each group is proportional to the width of a pulse from shaper 24. The groups of oscillations on lead 32 are then fed to a preset counter 34 which will produce an output signal on lead 36 whenever the oscillations on lead 32 exceed a predetermined number.

The displacement detector 30 comprises a device for producing an output pulse on lead 38 to reset the counter 34 in response to a predetermined number of oscillations from tachometer generator 28. Thus, after the strip 10 has traveled a predetermined distance and the tachometer generator 28 has produced a number of oscillations corresponding to the travel of strip 10, the displacement detector 30 will reset counter 34 whereby the counter will begin counting from zero even though the oscillations on lead 32 which have already been counted are not sufficient to produce an output signal on lead 36. From a consideration of the overall operation of the system, it will be apparent that the number of oscillations appearing on lead 32 will be proportional to the total length of the strip 10 having defects thereon. In this manner, if the counter 34 is set to count 15,000 oscillations, it will produce an output signal on lead 36 to indicate an inferior surface condition whenever 15,000 oscillations or more appear on lead 32. If 15,000 oscillations do not appear on lead 32 after the strip 10 has traveled a sufficient distance to reset the counter through displacement detector 30, then the counter 34 will have to count another 15,000 oscillations before producing an output signal on lead 36. Thus, if an output signal does not appear on lead 36 between the times that the counter 34 is reset, the total length of the defects on strip 10 for that particular length of the strip inspected is not great enough to render the material unacceptable.

One type of an arrangement which may be used to direct a narrow light beam on the surface of strip 10 and to position the bank of photoelectric cells 20 is shown in FIG. 2. It comprises an outer housing 40 which supports a block 41 of plastic or other similar material. The block 41 has a first longitudinally-extending passage 42 which serves to direct light from a lamp 44 onto the surface of strip 10 along a path 46 extending substantially perpendicular to the direction of movement of the strip. As shown, the lamp 44 is positioned within a shield 43 carried on the housing 40. The light from lamp 44 is focused onto strip 10 by means of a lens 45. The light reflected from the strip 46 is then conducted via passage 48 in the block 41 to the respective photoelectric cells 50. In this manner, the cells 50 are shielded from all external sources of light and are affected only by the light reflected from the surface of strip 10 at 46.

In FIG. 3, it will be seen that the anodes of the respective photoelectric cells 50 are all connected to a source of positive plate voltage, identified as B+. The cathodes of the respective photoelectric cells are, in turn, connected to ground through resistor 52. Although only one bank of photoelectric cells extending across the entire width of strip 10 are shown herein, it should be apparent that two or more banks of cells may be spaced across the width of the article being inspected whereby the strip 10 is divided into zones or sections which are inspected individually. Whenever a defect passes under a respective one of the cells 50, the light reflected from the surface of strip 10 will decrease in intensity whereby the impedance of that cell will increase. Consequently, the voltage across resistor 52 will decrease. Furthermore, the amount by which the voltage across resistor 52 decreases is a function of the number of defects passing under the bank of photoelectric cells at any instant and, hence, the total number of cells 50 which decrease in conductivity.

The voltage across resistor 52 will, therefore, appear as wave form A in FIG. 4 wherein a decrease in voltage is produced whenever one or more defects pass under the cells 50. The amount by which the voltage decreases is a function of the total width of the defects passing under the photoelectric cells 50 at any instant. Thus, in wave form A, the voltage excursion 54 may be produced when a particularly wide defect or a plurality of defects pass under the light band 46. Since the excursion 54 does not persist for any great length of time, the significance is that the length of the defect or defects is relatively short. The voltage excursion 56 will be produced by a defect which has about one-half the length of the defect which produced voltage excursion 54, and in this case the total width of the defect or defects is less than that which produced the voltage excursion 54 since the voltage in this case did not decrease as much. The defect or defects producing voltage excursion 58 have still a lesser width across the length of strip 10. In the case of voltage excursion 60, the defect or defects have about the same width across the strip 10 as did the defect or defects producing excursion 56. In this case, however, the length of the defect is much greater than that which produced excursion 56 since it persists for a longer period of time. Voltage excursion 62 is also produced by a defect having a relatively long length, meaning that it took a relatively long time for the defect to pass through the light band 46.

The voltage on resistor 52 appearing as wave form A is inverted in inverter circuit 64 and applied as wave form B (FIG. 4) to the shaper 24 which, in this case, comprises a Schmitt trigger or multivibrator circuit. As is well known to those skilled in the art, the Schmitt trigger multivibrator comprises a pair of triodes 68 and 70 having their cathodes connected to ground through a common resistor 72. The anode of triode 68 is connected to a source of positive plate voltage, identified as B+, through resistors 74 and 76; whereas, the plate of triode 70 is connected to this same source of plate voltage through resistors 78 and 76. It will be noted that the anode of triode 68 is connected to the grid of triode 70 through the parallel combination of capacitor 80 and resistor 82. Grid resistor 84 for triode 70 completes the circuit.

Under normal conditions, triode 70 will conduct while triode 68 will be cut off. When a positive pulse or voltage excursion in wave form B is applied to the grid of triode 68, however, it will begin conduction when the pulse in wave form B reaches a predetermined amplitude, this amplitude being indicated at 86 in FIG. 4. Conduction in tube 68 will cut off tube 70 because of the fall in the plate voltage of tube 68 which is connected to the grid of tube 70 through the elements 80 and 82. Triode 68 will continue to conduct until the voltage level of the pulse in wave form B falls below the aforesaid predetermined amplitude 86, at which time it will cut off and triode 70 will again conduct. The output appearing at the plate of triode 70, therefore, is wave form C which comprises a series of positive square wave pulses of constant amplitude, each of which has a pulse width substantially equal to the width of a corresponding pulse in wave form B which was fed to the grid of triode 68. The output of the shaper 24 on the plate of triode 70 is then fed to the gate circuit 26.

As was explained in connection with FIG. 1, the tachometer generator 28 will produce an alternating current output signal having a frequency proportional to the speed of the strip 10. Thus, the output of the tachometer generator may appear as wave form D in FIG. 4. This wave form is gated with wave form C in gate circuit 26 whereby the output of the gate circuit will appear as wave form E which comprises a series of groups of oscillations with the number of oscillations in each group being proportional to the width of the corresponding pulse in wave form C. It should be apparent that the number of oscillations in each group in wave form E is also proportional to the length of a defect on the surface of strip 10. Wave form E is fed to the counter 34 which will produce an output signal on the lead 36, as was explained above, whenever the oscillations passing through gate circuit 26 exceeds a predetermined number. Counter 34 may comprise any of the well known devices for counting a predetermined number of input pulses. Counters of this type usually comprise a series of cascaded bistable multivibrator or flip-flop circuits together with appropriate feed-back loops in order to obtain the desired number of counts.

It will be noted that a ground connection 88 is provided for the counter 34 through lead 90 and the normally open contacts 92 of relay 94. This ground connection is provided for the control grid in one of the two electron valves in each of the bistable multivibrator circuits provided in counter 34. Thus, when contacts 92 of relay 94 close, one of the two grids of the various bistable multivibrators will be grounded whereby the counting circuit will be reset to its initial counting condition. That is, if it is assumed that counter 34 is adjusted to count 15,000 pulses before producing an output signal on lead 36 and that it has counted only 12,000 pulses when contacts 92 close, it will be reset whereby it will have to count an additional 15,000 pulses 34 may be manually reset by depressing push button to produce an output signal on lead 36. The counter switch 96 to produce the same effect as that produced when contacts 92 close.

The relay 94 is controlled by the displacement detector 30, described in connection with FIG. 1 and enclosed by broken lines in FIG. 3. Included in this circuit is a variable gain amplifier 98 which is connected to the output of tachometer generator 28. From amplifier 98, the alternating current output signal of tachometer generator 28 is fed to a diode clipping and peaking circuit 100. The alternating current from tachometer generator 28 is also fed to an automatic gain control circuit 102 which produces a direct current voltage proportional to the average voltage level of the sine wave from tachometer 28. As will be understood, both the amplitude and the frequency of the signal output of the tachometer increase as the speed of strip 10 increases. The output of circuit 102 is thus fed to the variable gain amplifier 98 to control its output level and insure that the sine wave output of the amplifier will always be of the same amplitude. The diode clipping and peaking circuit 100 removes the negative half-cycles of the sine wave from amplifier 98 and peaks the positive half-cycles. Further peaking and amplification is achieved in peaking amplifier 104 whose output is then used to actuate a Schmitt trigger multivibrator 106 which is identical to the Schmitt trigger circuit already described. The output of trigger circuit 106 will then comprise a succession of square wave voltage pulses, each of which persists for the time duration of a peak in the wave form at the output of amplifier 104. These pulses are then used to trigger a one-shot multivibrator 108 which will produce a voltage pulse of fixed width each time a pulse is received from circuit 106. The output of multivibrator 106 will, therefore, comprise a succession of pulses or square waves having a frequency identical to the output frequency of tachometer generator 28. This square wave signal is fed through cathode follower attenuator 110 and lead 112 to a series of binary counters 114, 116, 118.

The output of tachometer generator 28 is also fed to a rectifier 120, the output voltage of which is passed through a direct current amplifier or reset generator 122 to a relay 124. This relay, acting through lead 126, resets the binaries 114–118 in response to a direct current voltage from rectifier 120. Thus, when the leading edge of the strip 10 causes the roller connected to tachometer generator 28 to rotate, the binaries will be reset, insuring that counting begins at the aforesaid leading edge. The output of the last or $n$th binary 118 is then fed to a one-shot multivibrator 128 which produces a pulse to momentarily energize the relay 94 and close contacts 92, thereby resetting the counter 34. Since the strip 10 moves continuously to rotate conveyor roll 12, successive pulses will be produced at the output of multivibrator 128 and will appear as wave form F in FIG. 4 where each pulse resets the counter 34.

In operation, the wave form E will be produced at the output of gate circuit 26 as long as defects pass under the photoelectric cells 50. At the same time, the one-shot multivibrator 128 will produce an output signal to energize relay 94 and reset the counter 34 whenever the binaries 114–118 have counted a predetermined number of oscillations in the output signal of tachometer generator 28. Regardless of the speed of the strip 10, the number of oscillations produced by the generator 28 will be the same for a given length of strip 10. That is, when the speed of the strip 10 increases so that it takes a shorter amount of time for a predetermined length of the strip to pass under the photoelectric cells, the output frequency of the tachometer generator 28 is increased so that a pulse appears at the output of one-shot multivibrator 128 in a shorter period of time than it would if the speed of the strip were slower. Similarly, the number of oscillations passing through gate circuit 26 for a given defect condition on the surface of strip 10 will be the same regardless of the speed of the strip. If the speed of the strip should increase, the length of the pulses at the output of shaper 24 will decrease for a given defect length; however, at the same time, the frequency of the oscillations passing through the gate circuit 26 will increase. In other words, whenever the pulse width of the pulses at the output of shaper 24 decreases in response to an increase in speed, the frequency or number of oscillations passed through the gate for each pulse increases so that the overall effect is the same for any speed of the strip. In this manner, the counter 34 will produce an output pulse on lead 36 whenever the total defect length on a particular section of strip 10 exceeds a predetermined value. Thus, the signal on lead 36 may appear as wave form G in FIG. 4. At time $t_1$, a pulse in wave form F will reset counter 34. The number of oscillations in wave form E due to pulse 54 in wave form A is great enough to produce a signal on lead 36. Consequently, at time $t_2$ the voltage in wave form G increases and remains at this higher level until time $t_3$ when a second pulse in wave form F resets the counter. In the second cycle of operation, the oscillations in wave form E due to pulses 56 and 58 in wave form A are not great enough in number to raise the voltage on lead 36; and, conseqeuntly, a pulse is not produced in wave form G between time $t_3$ and $t_4$. At time $t_4$ the counter 34 is again reset and the oscillations in wave form E due to pulses 56 and 58 are effectively "erased" or forgotten, meaning that the counter will again start counting from zero. At time $t_5$, the counter again raises the voltage on lead 36 to produce an output pulse. This pulse is produced in response to the oscillations in wave form E due to pulse 60 in wave form A, as is the next successive pulse. The last two pulses in wave form G are due to pulse 62 in wave form A. In this manner, a pulse will be produced in wave form G whenever the number of oscillations in wave form E is great enough to raise the voltage on lead 36 between the times that the counter 34 is reset.

Wave form G may then be applied to a printer, for example, which will provide a permanent record of the surface condition of successive lengths of strip 10. If counter 34 is reset each time the strip travels five feet, and if a pulse is produced in wave form G during the time that a particular five-foot length is under the cells 50, the significance is that that particular five-foot length has an inferior surface quality. If successive and separate sheets are inspected, then the pulses in wave form G may be used in an obvious manner to actuate a mechanism for ejecting a sheet of inferior surface quality.

While a specific embodiment of the invention has been shown herein, it will be realized that many modifications thereof are feasible without departing from the spirit and scope of the invention. If an irradiant, hot object is inspected, for example, the pulses produced by the photoelectric cells 50 may be of positive or negative polarity due to the fact that some defects in an irradiant object may appear brighter than the remainder of the material while other defects appear darker. Such positive and negative defect pulses may be converted to one polarity in accordance with the teachings of application Serial No. 832,228, filed August 7, 1959, now Patent No. 2,976,490, and then used in the same manner as the pulses of wave form A shown herein.

I claim as my invention:

1. In an inspection system for detecting areas on the surface of moving material having a different optical appearance than the remainder of the material, the combination of apparatus including a stationary photoelectric cell disposed adjacent the moving material for producing an electric signal in which a pulse is produced whenever an area of different optical appearance on the material passes by said photoelectric cell, the width of said pulse being proportional to the length of said area along the path of travel of the material, means for producing an alternating current signal, means for gating said alternating current signal with the pulses produced by said apparatus, and means for counting the oscillations in the alternating current signal passing through said gating means.

2. In an inspection system for detecting areas on the surface of moving material having a different optical appearance than the remainder of the material, the combination of apparatus including a photoelectric cell disposed adjacent the moving material for producing an electrical signal in which a pulse is produced whenever an area of different optical appearance passes by said photoelectric cell, means for producing an alternating current signal having a frequency proportional to the speed of said moving material, means for gating said alternating current signal with the pulses produced by said apparatus, means for counting the oscillations in said alternating current signal passing through said gating means, and means for resetting the counting means after said material has traveled a predetermined distance.

3. In an inspection system for detecting defects on the surface of moving material in which the defects have a different optical appearance than the remainder of the material, the combination of apparatus including a photosensitive device disposed adjacent the moving material for producing an electrical signal in which a pulse is produced whenever a defect passes by said photosensitive device, said pulse persisting for the period during which the defect is adjacent the photosensitive device, means for producing an alternating current signal having a frequency proportional to the speed of said moving material, means for gating said alternating current signal with the pulses produced by said apparatus, and means for counting the oscillations in said alternating current signal passing through said gating means.

4. In an inspection system for detecting defects on the surface of moving material in which the defects have a different optical appearance than the remainder of the material, the combination of apparatus including a photosensitive device disposed adjacent the moving material for producing an electrical signal in which a pulse is produced whenever a defect passes by said photosensitive device, said pulse persisting for the period during which the defect is adjacent the photosensitive device, means for producing an alternating current signal having a frequency proportional to the speed of said moving material, means for gating said alternating current signal with the pulses produced by said apparatus whereby the output of said gating means will be a series of groups of oscillations in which the number of oscillations in each group is proportional to the width of an associated one of said pulses produced by said apparatus, means for counting the oscillations passing through said gating means, and means for resetting the counting means after said material has traveled a predetermined distance.

5. In an inspection system for detecting defects on a reflective surface of moving material in which the defects have a different reflectivity than the remainder of the material, the combination of means for directing a narrow band of light on said material along a path extending transverse to the direction of movement of the material, apparatus including a photosensitive device responsive to the light reflected from said narrow band for producing an electrical signal in which a pulse is produced whenever a defect passes under the light band, means for producing an alternating current signal having a frequency proportional to the speed of said moving material, means for gating said alternating current signal with the pulses produced by said apparatus, and means for counting the oscillations passing through said gating means.

6. In an inspection system for detecting defects on a reflective surface of moving material in which the defects have a different reflectivity than the remainder of the material, the combination of means for directing a narrow band of light on said material along a path extending transverse to the direction of movement of the material, apparatus including a photosensitive device responsive to the light reflected from said narrow band for producing an electrical signal in which a pulse is produced whenever a defect passes under the light band, said pulse persisting during the time that a defect is under the light band, means for producing an alternating current signal having a frequency proportional to the speed of said moving material, means for gating said alternating current signal with the pulses produced by said apparatus whereby the output of the gating means will be a series of groups of oscillations in which the number of oscillations in each group is proportional to the width of an associated one of the pulses produced by said apparatus, means for counting the oscillations passing through said gating means, and means for resetting the counting means after said material has traveled a predetermined distance.

7. In an inspection system for detecting defects on the surface of moving material in which the defects have a different optical appearance than the remainder of the material, the combination of a bank of photoelectric cells disposed adjacent said material along a path extending transverse to the direction of movement of said material, circuit means interconnecting said photoelectric cells and adapted to produce an electrical signal in which a pulse is produced whenever a defect passes by any one of the photoelectric cells, means for producing an alternating current signal having a frequency proportional to the speed of said moving material, means for gating said alternating current signal with the pulses produced by said circuit means, means for counting the oscillations passing through said gating means, and means for resetting the counting means after said material has moved a predetermined distance.

8. In an inspection system for detecting defects on the surface of moving material in which the defects have a different optical appearance than the remainder of the material, the combination of a bank of photoelectric cells disposed adjacent the said material along a path extending transverse to the direction of movement of said material, circuit means interconnecting said photoelectric cells and adapted to produce a current variation whenever a defect passes by any one of said photoeelectric cells, the magnitude of said current variation being a function of the defect area passing under the photocells at any instant, multivibrator means responsive to the current variations produced by said circuit means for producing a pulse whenever a current variation exceeds a predetermined magnitude, said pulse persisting for the time during which the current variation exceeds said predetermined value, means for producing an alternating current signal having a frequency proportional to the speed of said moving material, means for gating said alternating current signal with the pulses produced by said multivibrator means, means for counting the oscillations passing through said gating means, and means for resetting the counting means after said material has traveled a predetermined distance.

9. In an inspection system for detecting defects on the surface of moving material in which the defects have a different optical appearance than the remainder of the material, the combination of a conveyor on which said material travels, apparatus including a photoelectric cell disposed adjacent the moving material for producing an electrical signal in which a pulse is produced whenever a defect passes by said photoelectric cell, a tachometer generator operatively connected to said conveyor and adapted to produce an alternating current output signal having a frequency proportional to the speed of said moving material, means for gating said alternating current signal with the pulses produced by said apparatus, means for counting the oscillations in said alternating current signal passing through said gating means, a device for producing a pulse in response to a predetermined number of oscillations in said alternating current signal, and means responsive to a pulse produced by said device for resetting said counter means.

10. In an inspection system for detecting defects on the surface of moving material in which the defects have a different optical appearance than the remainder of the material, the combination of apparatus including a photoelectric cell disposed adjacent the moving material for producing an electrical signal in which a pulse is produced whenever a defect passes by said photoelectric cell, means for producing an alternating current signal having a frequency proportional to the speed of said moving material, means for gating said alternating current signal with the pulses produced by said apparatus, means for counting the oscillations in said alternating current signal passing through said gating means to produce an output signal whenever the oscillations passing through said gating means exceed a predetermined number, a device for producing a pulse in response to a predetermined number of oscillations in said alternating current signal, and means responsive to a pulse produced by said device for resetting said counting means.

11. In an inspection system for detecting defects on the surface of moving material in which the defects have a different reflectivity than the remainder of the material, the combination of means for directing a narrow band of light on said material along a path extending transverse to the direction of movement of the material, apparatus including a photosensitive device responsive to the light reflected from said narrow band for producing an electrical signal in which a pulse is produced whenever a defect passes under the light band, a conveyor on which said material travels, a tachometer generator operatively connected to said conveyor and adapted to produce an alternating current output signal having a frequency proportional to the speed of said moving material, means for gating said alternating current signal with the pulses produced by said apparatus, means for counting the oscillating in said alternating current signal passing through said gating means, a device for producing a pulse in response to a predetermined number of oscillations in said alternating current signal, and means responsive to a pulse produced by said device for resetting said counting means.

12. In an inspection system for detecting defects on the surface of moving material in which the defects have a different reflectivity than the remainder of the material, the combination of means for directing a narrow band of light on said material along a path extending transverse to the direction of movement of the material, a bank of photoelectric cells disposed adjacent said material along the path of said band of light whereby the conductivity of the photoelectric cells will be a function of the light reflected from the surface of said material along said band of light, circuit means interconnecting said photoelectric cells and adapted to produce an electrical signal in which a pulse is produced whenever a defect passes by one of the photoelectric cells, a conveyor on which said material travels, a tachometer generator operatively connected to said conveyor and adapted to produce an alternating current output signal having a frequency proportional to the speed of said moving material, means for gating said alternating current signal with the pulses produced by said circuit means, means for counting the oscillations in said alternating current signal passing through said gating means, a device for producing a pulse in response to a predetermined number of oscillations in said alternating current signal, and means responsive to a pulse produced by said device for resetting the counting means.

13. In an inspection system for detecting defects on the surface of moving material in which the defects have a different reflectivity than the remainder of the material, the combination of means for directing a narrow band of light on said material along a path extending transverse to the direction of movement of the material, a bank of photoelectric cells disposed adjacent the said material along a path extending parallel to said narrow band of light, circuit means interconnecting said photoelectric cells and adapted to produce a current variation whenever a defect passes under said light band, the magnitude of said current variation being a function of the total defect area passing under the light band at any instant, multivibrator means responsive to the current variations produced by said circuit means for producing a pulse whenever a current variation exceeds a predetermined magnitude, said pulse persisting for the time during which the current variation exceeds said predetermined value, a conveyor on which said material travels, a tachometer generator operatively connected to said conveyor and adapted to produce an alternating current output signal having a frequency proportional to the speed of said moving material, means for gating said alternating current signal with the pulses produced by said multivibrator means, means for counting the oscillations in said alternating current signal passing through said gating means to produce an output signal whenever the number of oscillations passing through the gating means exceeds a predetermined number, a device for producing a pulse in response to a predetermined number of oscillations in said alternating current signal, and means responsive to a pulse produced by said device for resetting said counting means whereby the counting means will begin counting from zero without producing an output signal when the oscillations passing through said gating means has not exceeded said predetermined number.

References Cited in the file of this patent

UNITED STATES PATENTS

| | | |
|---|---|---|
| 2,494,441 | Hillier | Jan. 10, 1950 |
| 2,674,915 | Anderson | Apr. 13, 1954 |
| 2,803,755 | Milford | Aug. 20, 1957 |
| 2,941,086 | Gottschall et al. | June 14, 1960 |
| 2,968,793 | Bellamy | Jan. 17, 1961 |